(No Model.)
W. & E. H. ULRICH.
CLAMP FOR STONE SAWS.
No. 421,846. Patented Feb. 18, 1890.
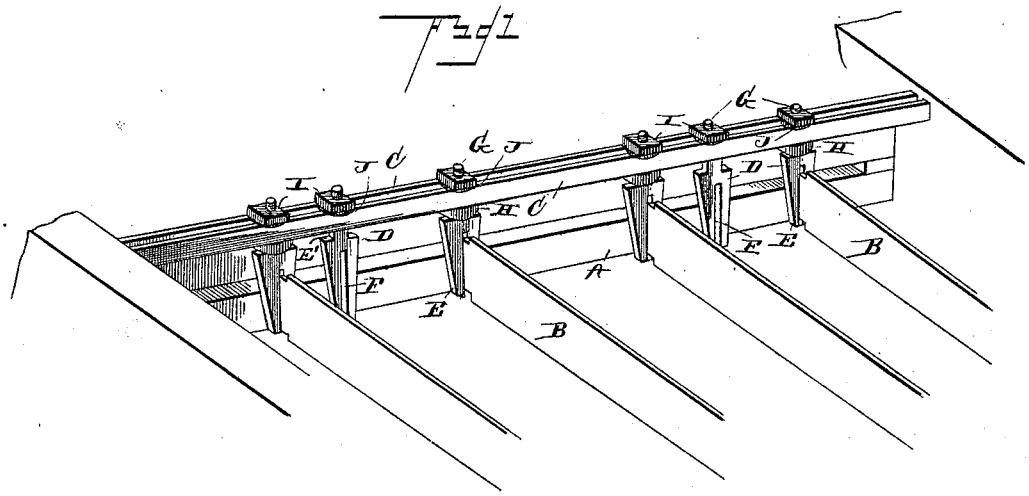
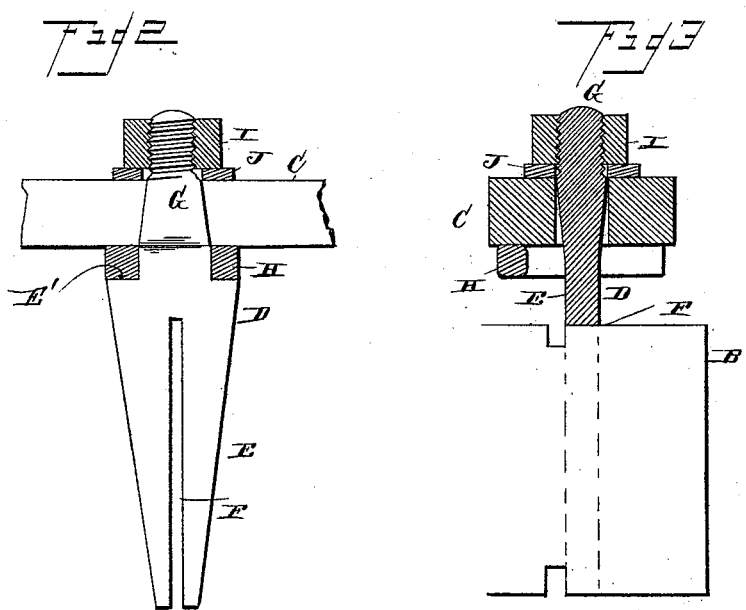
Witnesses
John Imirie
D. J. Siggers
By their Attorneys,
C. A. Snow & Co.
Inventors
William Ulrich
and
Edwin H. Ulrich

UNITED STATES PATENT OFFICE.

WILLIAM ULRICH AND EDWIN H. ULRICH, OF MANHATTAN, KANSAS.

CLAMP FOR STONE-SAWS.

SPECIFICATION forming part of Letters Patent No. 421,846, dated February 18, 1890.

Application filed August 29, 1889. Serial No. 322,294. (No model.)

*To all whom it may concern:*

Be it known that we, WILLIAM ULRICH and EDWIN H. ULRICH, citizens of the United States, residing at Manhattan, in the county of Riley and State of Kansas, have invented a new and useful Clamp for Stone-Saws, of which the following is a specification.

Our invention relates to improvements in clamps for stone-saws; and it consists in certain novel features, hereinafter described and claimed.

In the accompanying drawings, Figure 1 is a perspective view of a portion of a gang of stone-saws having our improved device applied thereto. Fig. 2 is an enlarged vertical section of the clamping device. Fig. 3 is a section taken at right angles to Fig. 2.

The saw-frame A is of the usual or any preferred construction, and the saws B are secured therein in the usual or any preferred manner. Across the ends of the saw-frame we secure the parallel bars C C, as clearly shown.

In carrying out our invention, after the saws have been secured in the saw-frame and have been stretched to the desired tension, we pass downward through the space between the parallel bars C C a clamping-block D, consisting of a body E of suitable size and having a slot F in its lower end, which is adapted to fit over the upper edge of the saw. This body is cut away on its sides to form shoulders E', between which it is provided at its upper end with a stem G, having a threaded extremity, which is adapted to project upward through and above the parallel bars C C. A washer H is inserted between the upper end of the body E and the under side of the parallel bars C C and a clamping-nut I mounted on the threaded extremity of the stem G. The said nut I is then turned home, thereby securing the clamp firmly in place, so that it cannot move along the bars C C. A washer J may be inserted between the bars C C and the nut I; but this washer is not essential. The washer H, however, forms an important feature, as the clamp is made narrow enough to slip through the space between the bars C C, and unless this washer were employed the clamp would be drawn upward between the bars when the nut is turned home. Furthermore, the slot F in the body practically divides the latter into two arms, and when the nut I is screwed tightly home the shoulders E' of clamp will be drawn forcibly against the washer H and each arm of the body bent slightly inward, whereby a clamping effect upon the saw B is produced. The washer is made U-shaped, so that it may be readily slipped around the stem after the clamp has been put in place.

In practice the several parts are fitted together in the manner described, and the saws are thereby firmly secured at the desired points and held at the proper distance apart.

By the use of our device any one saw may be sharpened or repaired without disturbing any of the others, and the saws may be readily removed, replaced, and adjusted independently of each other, so as to be secured at the proper point to the frame.

Our device is very simple in its construction, can be easily and quickly manipulated, and its advantages are thought to be obvious.

Having thus described our invention, what we claim, and desire to secure by Letters Patent, is—

1. In a device of the character described, the combination, with the parallel bars C, of the clamp D, comprising a body E, having a reduced threaded stem G at its upper end, forming shoulders E' at each side of the body, the latter being provided with a central vertical slot F, adapted to receive the saw and extending upward to a point nearly opposite said shoulders, whereby the body is divided into two arms, the nut I, engaging said stem on the upper side of the parallel bars, and the washer H, fitting on said stem into said shoulders and between them and the under side of said parallel bars and pressing said arms together when the nut I is turned, as and for the purpose set forth.

2. In a device of the character described, the combination, with the frame A and the parallel bars C, of the independent clamps D and independent securing devices therefor, each comprising a body E, having a reduced threaded stem G at its upper end, forming shoulders E' at each side of the body, the latter being provided with a central vertical slot F, adapted to receive the saw, the nut I, engaging said stem on the upper side of the bars C, and the U-shaped washer H, removably inserted below said bars, around said stem, and within said shoulders, as and for the purpose set forth.

In testimony that we claim the foregoing as our own we have hereto affixed our signatures in presence of two witnesses.

WM. ULRICH.
E. H. ULRICH.

Witnesses:
CORA L. KIMBLE,
JNO. U. HIGINBOTHAM.